US008603654B2

(12) United States Patent
Cartwright et al.

(10) Patent No.: US 8,603,654 B2
(45) Date of Patent: Dec. 10, 2013

(54) SUPPLEMENTAL COOLANT HEATING FOR FUEL CELLS WITH METAL PLATES

(75) Inventors: Michael Cartwright, Naples, NY (US); Glenn W. Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2066 days.

(21) Appl. No.: 11/562,645

(22) Filed: Nov. 22, 2006

(65) Prior Publication Data
US 2008/0118788 A1 May 22, 2008

(51) Int. Cl.
*H01M 2/14* (2006.01)
(52) U.S. Cl.
USPC ............. 429/13; 429/428; 429/433; 429/434; 429/442; 429/452; 429/457
(58) Field of Classification Search
None
See application file for complete search history.

(56) References Cited

U.S. PATENT DOCUMENTS

| | | | | |
|---|---|---|---|---|
| 3,913,739 | A | * | 10/1975 | Hennessey .................... 206/434 |
| 6,103,410 | A | * | 8/2000 | Fuller et al. ..................... 429/13 |
| 6,358,638 | B1 | | 3/2002 | Rock et al. |
| 6,444,338 | B1 | | 9/2002 | Araki et al. |
| 2003/0203260 | A1 | * | 10/2003 | Lee ................................ 429/26 |
| 2004/0209150 | A1 | * | 10/2004 | Rock et al. ...................... 429/38 |
| 2004/0229099 | A1 | * | 11/2004 | Standke et al. ................. 429/26 |
| 2005/0271908 | A1 | * | 12/2005 | Lin et al. ........................ 429/13 |
| 2010/0086830 | A1 | | 4/2010 | Shimoi |

OTHER PUBLICATIONS

U.S. Patent Application entitled "Combustion—Thawed Fuel Cell", U.S. Appl. No. 11/112,129, filed Apr. 22, 2005.
U.S. Patent Application entitled "Fuel Cell Design and Control Method to Facilitate Self Heating through Catalytic Combusion of Anode Exhaust", U.S. Appl. No. 10/961,698, filed Oct. 8, 2004.
U.S. Patent Application entitled "FCPM Freeze Start Heater", U.S. Appl. No. 10/864,716, filed Jun. 9, 2004.
U.S. Patent Application entitled "Self-Thawingd Fuel Cell", U.S. Appl. No. 10/662,138, filed Sep. 12, 2003.
U.S. Patent Application entitled "Fuel Cell Stack Preheating", U.S. Appl. No. 10/447,072, filed Apr. 3, 2003.

* cited by examiner

*Primary Examiner* — Ula C. Ruddock
*Assistant Examiner* — A. Echelmeyer
(74) *Attorney, Agent, or Firm* — John A. Miller; Miller IP Group, PLC

(57) ABSTRACT

A fuel cell stack that includes catalyzed surfaces in the non-active inlet region of the cathode flow channels. At cold system start-up, hydrogen is introduced into the cathode inlet header to be mixed with air so that a chemical reaction is provided by the catalyst that generates heat to warm the cooling fluid in the non-active inlet area. Therefore, the cooling fluid that enters the active area of the stack will not be cold enough to quench the chemical reaction.

21 Claims, 2 Drawing Sheets

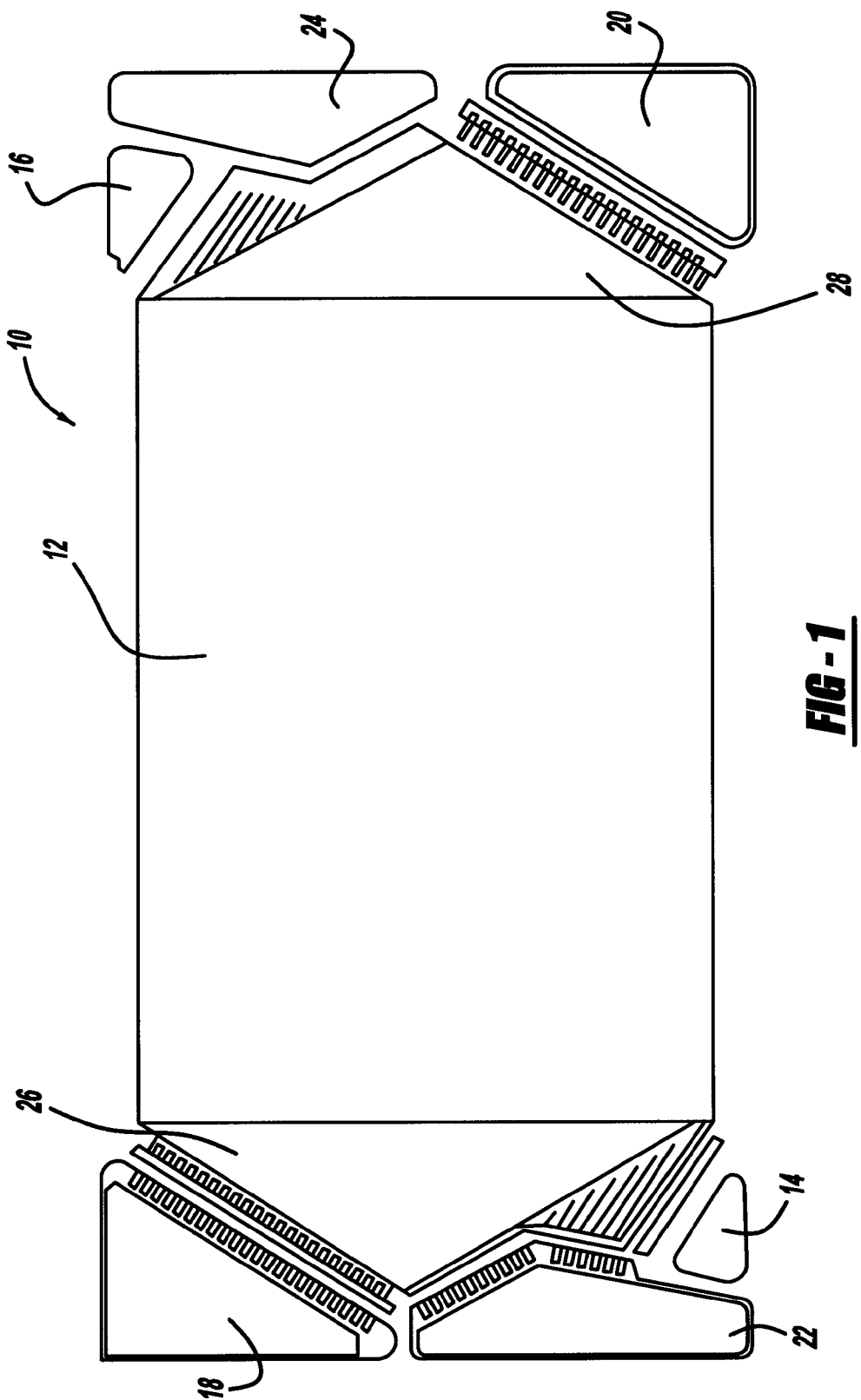

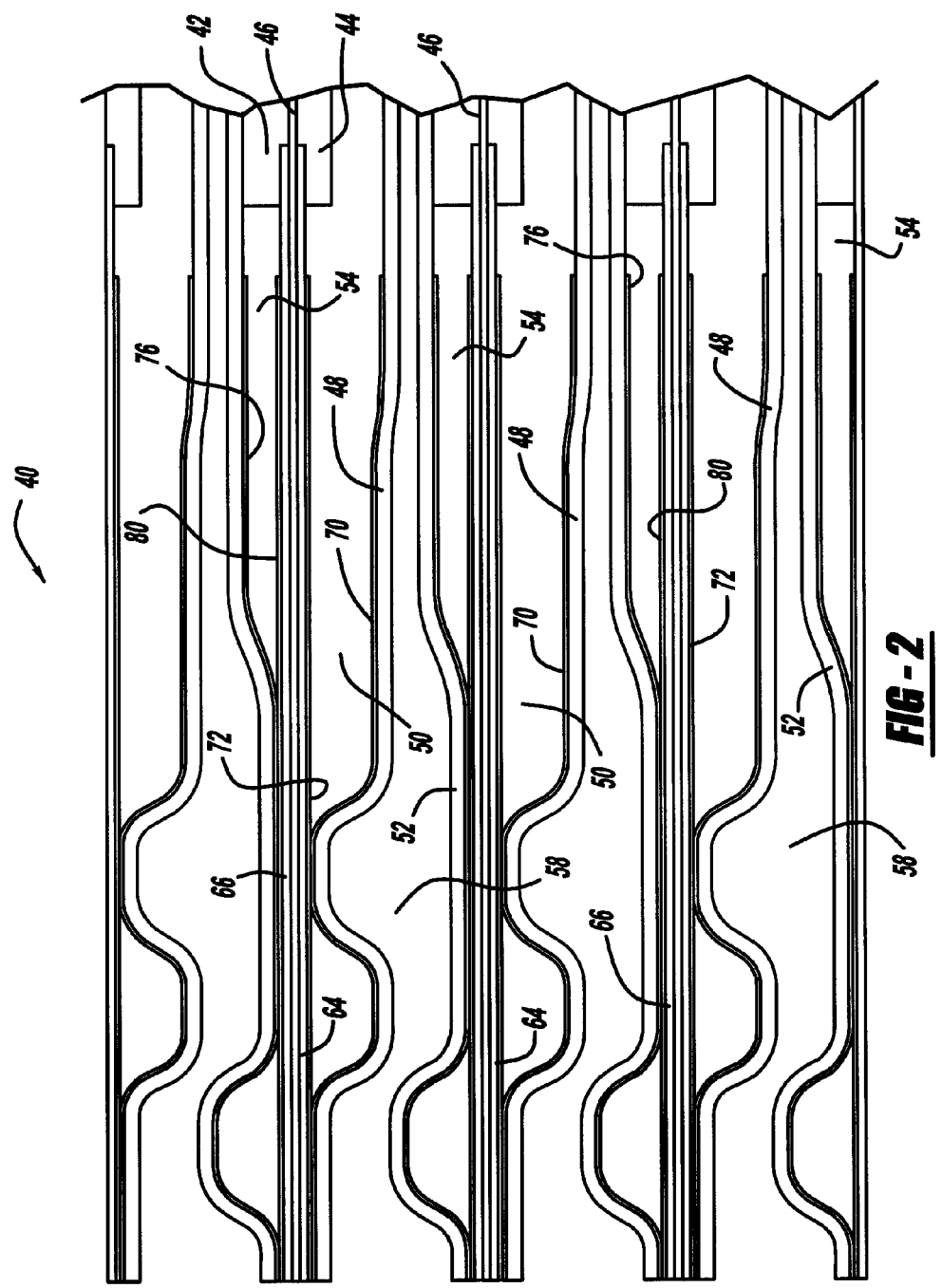

SUPPLEMENTAL COOLANT HEATING FOR FUEL CELLS WITH METAL PLATES

BACKGROUND OF THE INVENTION

1. Field of the Invention

This invention relates generally to a system and method for heating a cooling fluid in a cooling fluid inlet section of a fuel cell stack at cold stack start-up and, more particularly, to a system and method for heating the cooling fluid in a cooling fluid inlet section of a fuel cell stack at cold stack start-up, where the system and method include coating structures in the cathode flow field of the inlet area with a catalyst, and introducing hydrogen into the cathode inlet header at start-up to cause a chemical reaction that generates heat.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

Excessive stack temperatures may damage the membrane and other materials in the stack. Fuel cell systems therefore employ a thermal sub-system to control the temperature of the fuel cell stack. Particularly, a cooling fluid is pumped through the cooling fluid flow channels in the bipolar plates of the stack to draw away stack waste heat. During normal fuel cell stack operation, the speed of the pump is controlled based on the stack load, the ambient temperature and other factors, so that the operating temperature of the stack is maintained at an optimal temperature, for example 80° C. A radiator is typically provided in a cooling fluid loop outside of the stack that reduces the temperature of the cooling fluid heated by the stack where the cooled cooling fluid is cycled back through the stack.

For normal temperature fuel cell system start-up, i.e., above 0° C., the cooling fluid pump is typically immediately started so that the stack components are not damaged as a result of the heat generated by the fuel cell reaction. However, if the cooling fluid in the coolant loop and stack is very cold at system start-up, and the pump is started, the cold cooling fluid has a quenching effect on the fuel cell reaction that causes the stack output voltage and power to significantly drop. Particularly, especially for high power start-up, the sub-zero temperature of the cooling fluid significantly reduces the ability of the stack to generate the desired power. This quenching effect may last for several seconds, and possibly tens of seconds depending on the pump speed and the cooling fluid volume.

It is known in the art to delay the start of the pump at cold system start-up until the stack is generating significant waste heat. However, eventually the cold cooling fluid will enter the stack when the pump is started, which will have the same quenching effect on the warm fuel cells. Further, the very cold cooling fluid flow at cold start-up may act to freeze the product water generated by the stack, which could block flow channels and cause other significant problems.

SUMMARY OF THE INVENTION

In accordance with the teachings of the present invention, a fuel cell stack is disclosed that includes catalyzed structures in the cathode flow field of the non-active inlet region of the stack. At cold system start-up, hydrogen is introduced into the cathode inlet header to be mixed with air so that a chemical reaction is provided by the catalyst that generates heat to warm the cooling fluid in the non-active inlet region. Therefore, when the cooling fluid pump is started, the cooling fluid that enters the active area of the stack will not be cold enough to quench the chemical reaction. In alternate embodiments, structures in the anode flow field in the non-active inlet region can also be catalyzed, where air would be introduced into the anode flow field at cold start-up. Also, catalyzed structures can be provided in the cathode flow field and/or anode flow field in the non-active outlet region of the fuel cell stack.

Additional features of the present invention will become apparent from the following description and appended claims, taken in conjunction with the accompanying drawings.

BRIEF DESCRIPTION OF THE DRAWING

FIG. 1 is a cross-sectional view of a fuel cell stack including non-active regions and an active region; and FIG. 2 is a cross-sectional view of a few fuel cells in the non-active region of the fuel cell stack showing catalyzed structures, according to an embodiment of the present invention.

DETAILED DESCRIPTION OF THE EMBODIMENTS

The following discussion of the embodiments of the invention directed to a fuel cell stack including catalyst coated structures in a non-active cathode inlet region of the fuel cell stack to provide cooling fluid heating at cold start-up is merely exemplary in nature, and is in no way intended to limit the invention or its applications or uses.

FIG. 1 is a cross-sectional view through a fuel cell of a fuel cell stack 10 including an active region 12. The fuel cell stack 10 further includes an anode inlet header 14, an anode outlet header 16, a cathode inlet header 18, a cathode outlet header 20, a cooling fluid inlet header 22 and a cooling fluid outlet header 24. The fuel cell stack 10 further includes a non-active inlet region 26 between the inlet headers 14, 18 and 22 and the active region 12 through which the cathode reactant gas flows, the anode reactant gas flows and the cooling fluid flows through respective channels to the active region 12. The fuel cell stack 10 also includes a non-active outlet region 28 between the active region 12 and the outlet headers 16, 20 and 24 through which the exhaust gases and heated cooling fluid flow through respective channels to the outlet headers 16, 20 and 24.

According to the invention, a suitable structure within the cathode and/or anode gas flow fields of the non-active inlet region 26 is coated with a suitable low temperature catalyst that chemically reacts with oxygen and hydrogen to generate heat. FIG. 2 is a cross-sectional view of a plurality of fuel cells 40 in the non-active inlet region 26 in the stack 10. In this embodiment, the fuel cell stack 10 includes stamped flow field or bipolar plates where the bipolar plates in stack 10 are stamped from a suitable metal to define cathode flow channels, anode flow channels and cooling fluid flow channels. The stamped plates are welded or glued together at suitable locations, as would be well understood in the art, to provide the complete bipolar plate from the stamped plates. In other embodiments, the stamped plates can be nested, or made of a suitable composite material, such as graphite.

In the active region 12 of the fuel cell stack 10, each fuel cell 40 includes an anode side diffusion media layer 42, a cathode side diffusion media layer 44 and a membrane 46 therebetween. In this embodiment, the membrane 46 extends through the inlet region 26 between the various flow field plates. The flow field plates include cathode side flow field plates 48 that define cathode flow channels 50, anode side flow field plates 52 that define anode flow channels 54, where the combination of the plates 48 and 52 define cooling fluid flow channels 58 therebetween. In certain fuel cell stack designs, a shim 64 may be provided between the membrane 46 and the cathode side flow field plates 48, and a shim 66 may be provided between the membrane 46 and the anode side flow field plates 52.

According to the invention, a catalyst layer is provided on various structures in the cathode and/or anode flow fields. For example, the side of the cathode flow field plate 48 facing the cathode flow channels 50 can be catalyzed with a catalyst layer 70, and a side of the shims 64 facing the cathode flow channels 50 can be coated with a catalyst layer 72. Also, the side of the anode flow field plates 52 facing the anode flow channels 54 can be catalyzed with a catalyst layer 76, and the side of the shims 66 facing the anode flow channels 54 can be catalyzed with a catalyst layer 80.

It may not be necessary to catalyze both the cathode flow channels 50 and the anode flow channels 54, or both the cathode flow field plates 48 and the shims 64, or both the anode flow field plates 52 and the shims 66. The determination of which structures in the stack 10 are catalyzed would depend on the structure of the stack 10 and the amount of heat that was desired. Any suitable low temperature catalyst and any suitable catalyst loading can be provided for the purposes described herein. In one non-limiting example, the catalyst is Ceria supported platinum.

At cold system start-up, typically below 0° C., hydrogen would be introduced into the cathode inlet header 18 that would chemically react with the oxygen in the air and the catalyst creating heat. Alternately, or at the same time, air could be introduced into the anode inlet header 14 that would chemically react with the hydrogen and the catalyst creating heat. The heat would be transferred by the metallic structures of the plates from the cathode flow channels and/or the anode flow channels to the adjacent cooling fluid flow channels 48 so as to heat the cooling fluid therein. After a suitable period of time, the thermal sub-system pump would be started to pump the now heated cooling fluid into the cooling fluid flow channels of the active region 12 to draw heat therefrom as the stack 10 started producing heat from its operation. Thereafter, the hydrogen flow to the cathode side and/or the airflow to the anode side would be stopped because heating the cooling fluid would no longer be needed. The determination of when to start and stop the hydrogen and/or air flow to the flow fields at system start-up would depend on many parameters, as would be well understood to those skilled in the art.

As discussed above, the membrane 46 extends into the non-active inlet region 26. In alternate embodiments, the membrane 46 is not provided in the non-active inlet region 26, but is replaced with a sub-gasket, metal carrier, or other suitable structure.

In the embodiment discussed above, the catalyst is coated on the flow field plates or shims. In alternate embodiments, the catalyst can be coated on any other suitable structure within the non-active region 26 to provide the chemical reaction. The membrane 46 and/or diffusion media layers 42, 44 in the non-active region 26 can also be coated with a low temperature catalyst for the same purpose. Further, it may be desirable to also catalyze the cathode and/or anode flow field structures in the non-active outlet region 28 because as the pump circulates the cooling fluid, it is returned to the inlet header 22. In this design, fast system start-up may benefit by heating the cooling fluid at both ends of the stack 10.

In a typical fuel cell stack design, about one-third of the cooling fluid in the stack 10 is within the non-active inlet region 26, one third of the cooling fluid in the stack 10 is within the active region 12 and one third of the cooling fluid in the stack 10 is within the non-active outlet region 28. In alternate designs, the size of the non-active inlet region 26 could be increased so that more of the cooling fluid is heated at cold system start-ups.

The present invention has particular application for sub-zero system start-up. However, at system start-up above 0° C., it still may be beneficial to heat the cooling fluid in the non-active inlet region 26 for some period of time to raise the temperature of the fuel cell stack 10 to its operating temperature more quickly. Further, there are issues with the chemical reaction in the active region 12 producing water as a by-product, and acting to block an anode cathode reactant gas flow channels. By heating the cooling fluid at warmer start-ups, the water generated by the reaction is more likely to be water vapor that will not block the flow channels.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A fuel cell stack comprising:
a cathode inlet header for receiving a gas;

flow field plates defining cathode side reactant gas flow channels through which a cathode reactant gas flows and cooling fluid flow channels through which a cooling fluid flows;

an active region; and a non-active inlet region located between the cathode inlet header and the active region that receives the cathode reactant gas flow and the cooling fluid flow before the active region, wherein a structure within the cathode flow channels in the non-active inlet region includes a catalyst that reacts with hydrogen and air to generate heat to heat the cooling fluid in the non-active inlet region.

2. The stack according to claim 1 wherein the catalyst is coated on the cathode flow channels themselves.

3. The stack according to claim 1 wherein the catalyst is coated on a shim within the cathode flow channels.

4. The stack according to claim 1 wherein the catalyst is coated on a membrane in the non-active region.

5. The stack according to claim 1 wherein the catalyst is coated on a diffusion media layer in the non-active region.

6. The stack according to claim 1 wherein the catalyst is Ceria supported platinum.

7. The stack according to claim 1 wherein the volume of the cooling fluid flow channels in the non-active inlet region is greater than the volume of the cooling fluid flow channels in the active region.

8. The stack according to claim 1 further comprising a non-active outlet region that receives a cathode exhaust gas and the heated cooling fluid from the active region, wherein a structure within cathode flow channels in the non-active outlet region also includes a catalyst to produce heat to heat the cooling fluid.

9. The stack according to claim 1 wherein hydrogen is sent to the cathode side reactant gas flow channels in the non-active inlet region at system start-up to heat the cooling fluid.

10. The stack according to claim 1 wherein the flow field plates further define anode side reactant gas flow channels through which an anode reactant gas flows, wherein a structure within the anode flow channels in the non-active inlet region includes a catalyst that reacts with hydrogen and air to generate heat to heat the cooling fluid in the non-active inlet region.

11. The stack according to claim 1 wherein the fuel cell stack is part of a fuel cell system on a vehicle.

12. A fuel cell stack comprising:
a cathode inlet header for receiving a cathode inlet gas;
a non-active inlet region;
an active region;
a cathode outlet header for exhausting a cathode outlet gas from the stack;
a non-active outlet region, said non-active inlet region located between the cathode inlet header and the active region and said non-active outlet region located between the cathode outlet header and the active region;
cooling fluid flow channels extending through the non-active inlet region, the active region and the non-active outlet region through which a cooling fluid flows; and
cathode side reactant gas flow channels extending through the non-active inlet region, the active region and the non-active outlet region through which a cathode reactant gas flows, wherein the cathode flow channels in the non-active inlet region and the non-active outlet region include a catalyst coating that reacts with hydrogen and air to generate heat to heat the cooling fluid in the non-active inlet region and the non-active outlet region.

13. The stack according to claim 12 further comprising anode side reactant gas flow channels extending through the non-active inlet region, the active region and the non-active outlet region through which an anode reactant gas flows, wherein the anode flow channels in the non-active inlet region and the non-active outlet region include a catalyst coating that reacts with hydrogen and air to generate heat to heat the cooling fluid in the non-active inlet region and the non-active outlet region.

14. The stack according to claim 12 wherein the catalyst is Ceria supported platinum.

15. The stack according to claim 12 wherein the volume of the cooling fluid flow channels in the non-active inlet region is greater than the volume of the cooling fluid flow channels in the active region.

16. The stack according to claim 12 wherein hydrogen is sent to the cathode side reactant gas flow channels in the non-active inlet region at system start-up to heat the cooling fluid.

17. A method for heating a cooling fluid flowing through cooling fluid flow channels in a fuel cell stack at system start-up, said method comprising:
catalyzing a structure in cathode flow channels in a non-active inlet region of the stack, said non-active inlet region located between a cathode inlet header and an active region of the fuel cell stack; and
sending hydrogen and air to the cathode flow channels at system start-up so that the hydrogen and air react with the catalyst to generate heat that heats the cooling fluid in the non-active inlet region.

18. The method according to claim 17 wherein catalyzing a structure includes catalyzing a structure selected from the group consisting of the cathode flow channels, shims, a membrane and a diffusion media layer.

19. The method according to claim 17 further comprising delaying the start of a cooling fluid pump at system start-up until the temperature of the cooling fluid in the non-active inlet region has increased to a predetermined temperature.

20. The method according to claim 17 further comprising catalyzing a structure in cathode flow channels in a non-active outlet region of the fuel cell stack.

21. The method according to claim 17 further comprising catalyzing a structure in anode flow channels in the non-active inlet region, and introducing air into the anode flow channels at system start-up.

* * * * *